June 6, 1967 P. L. DUBOFF 3,323,851
UTILITY POLE ASSEMBLY AND ACCESSORIES FOR USE THEREWITH
Filed July 8, 1965 6 Sheets-Sheet 1
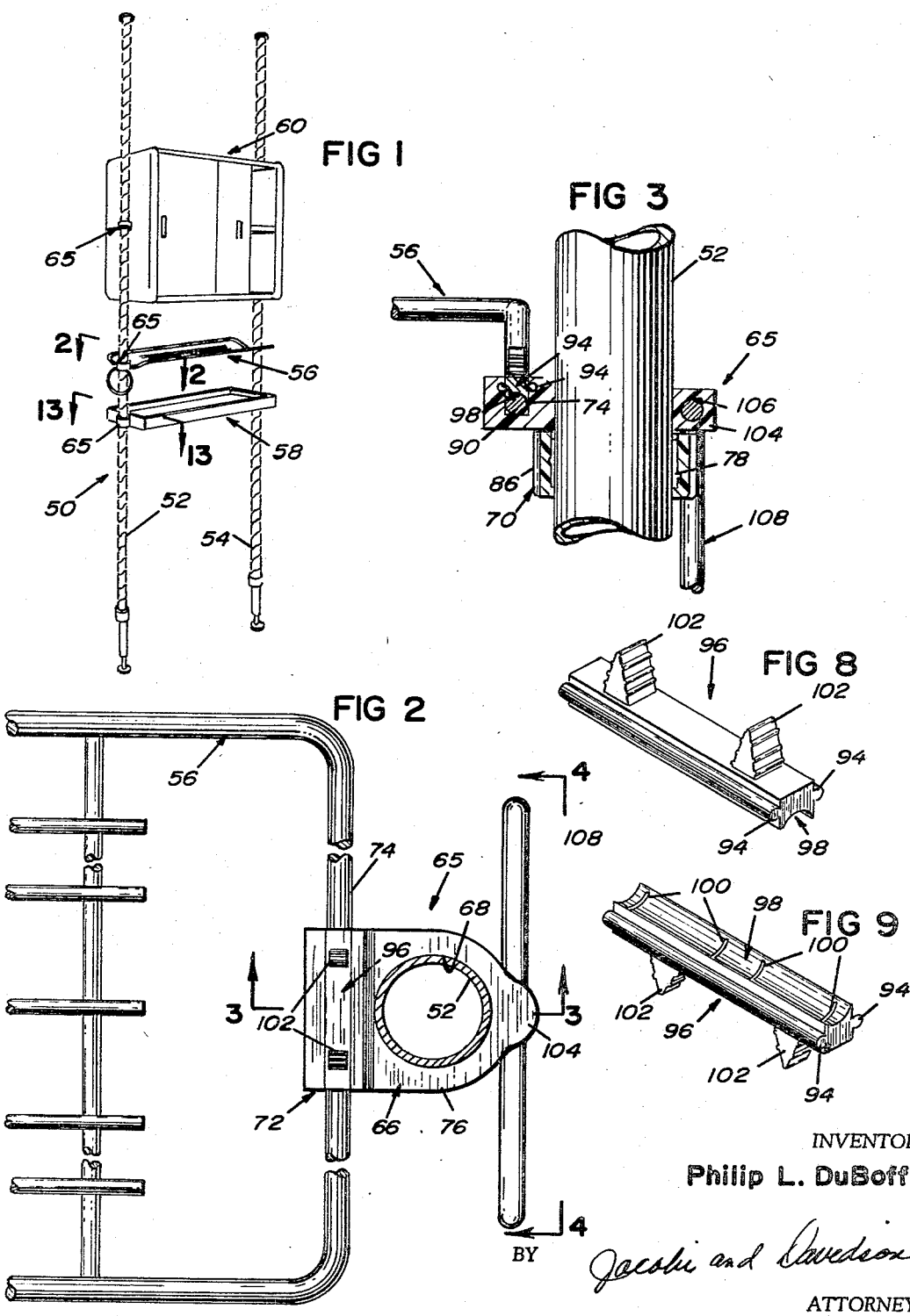
INVENTOR
Philip L. DuBoff
BY Jacobi and Davidson
ATTORNEYS June 6, 1967  P. L. DUBOFF  3,323,851
UTILITY POLE ASSEMBLY AND ACCESSORIES FOR USE THEREWITH
Filed July 8, 1965  6 Sheets-Sheet 2
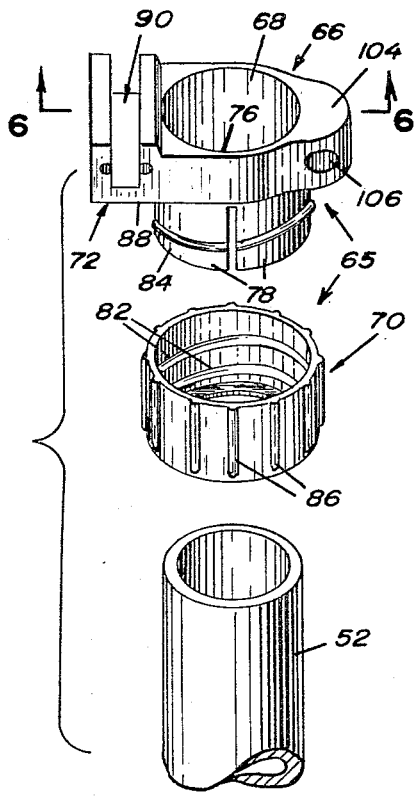
FIG 5
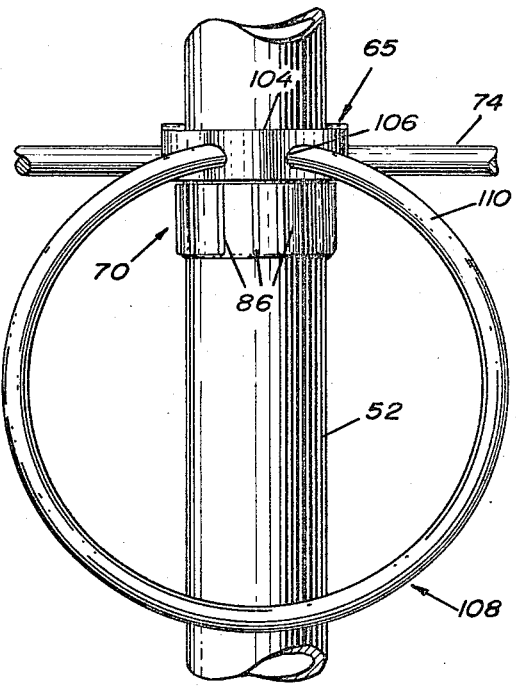
FIG 4
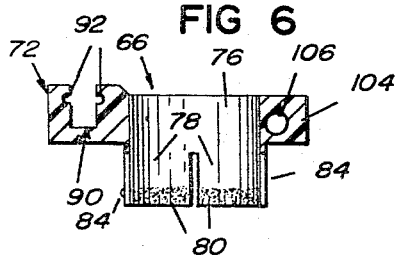
FIG 6
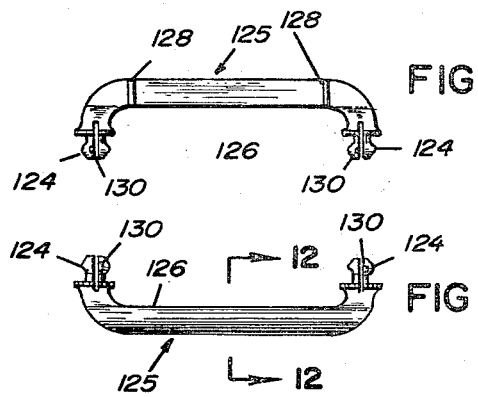
FIG 10
FIG 11
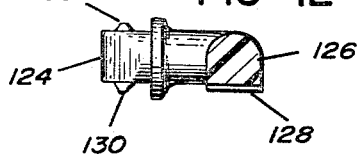
FIG 12
INVENTOR
Philip L. DuBoff
BY Jacobi and Davidson
ATTORNEYS

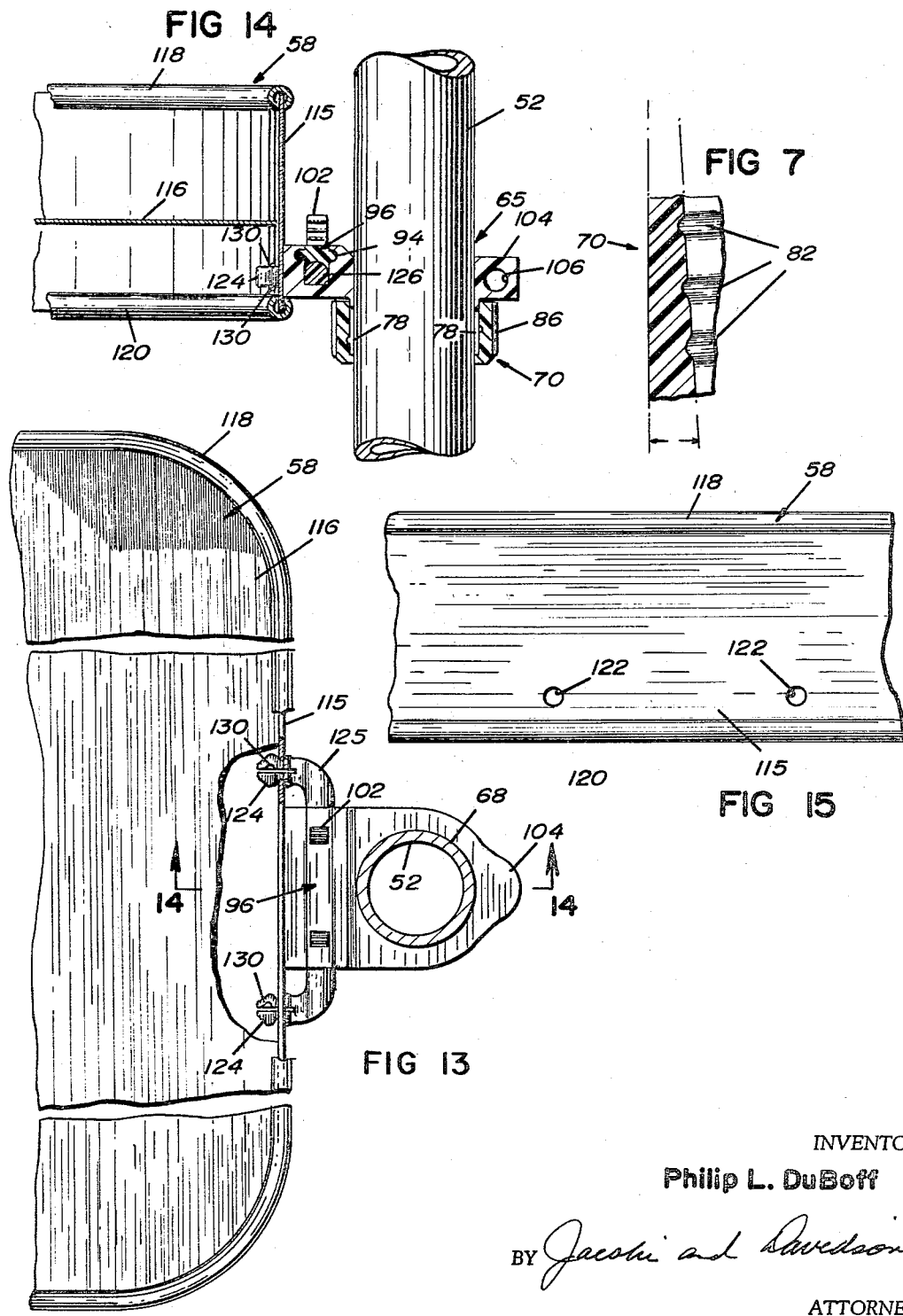

June 6, 1967  P. L. DUBOFF  3,323,851
UTILITY POLE ASSEMBLY AND ACCESSORIES FOR USE THEREWITH
Filed July 8, 1965  6 Sheets-Sheet 4
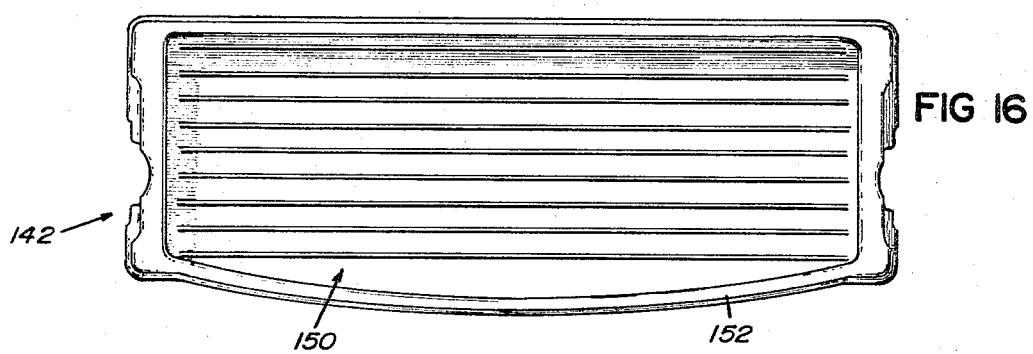
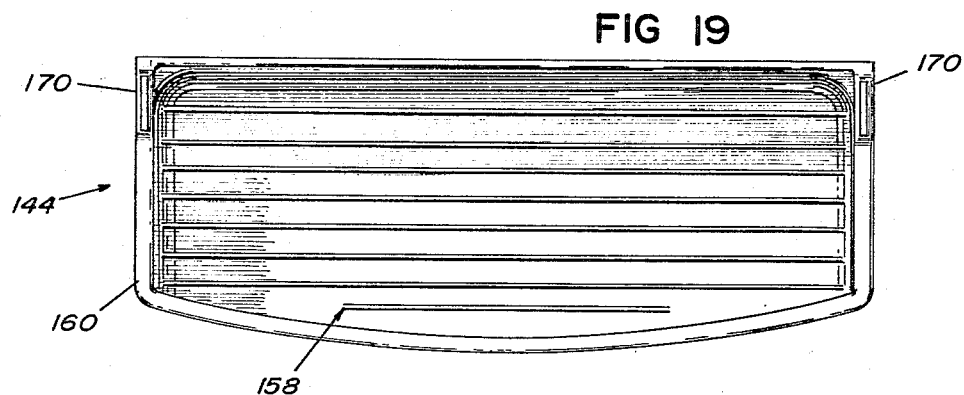
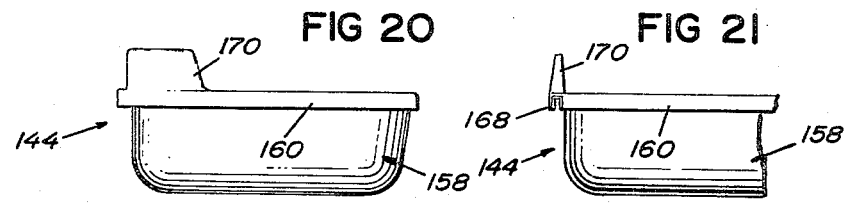
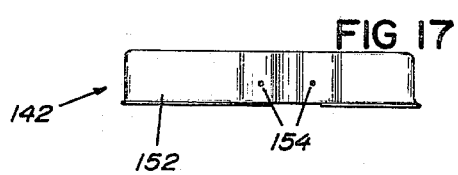
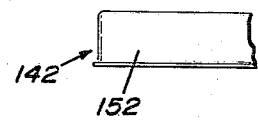
INVENTOR
Philip L. DuBoff
BY Jacobi and Davidson
ATTORNEYS

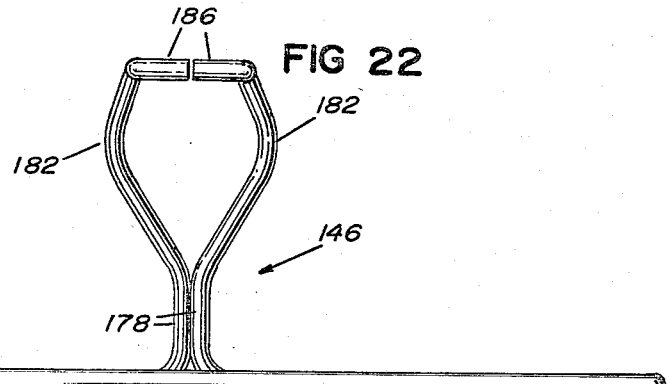
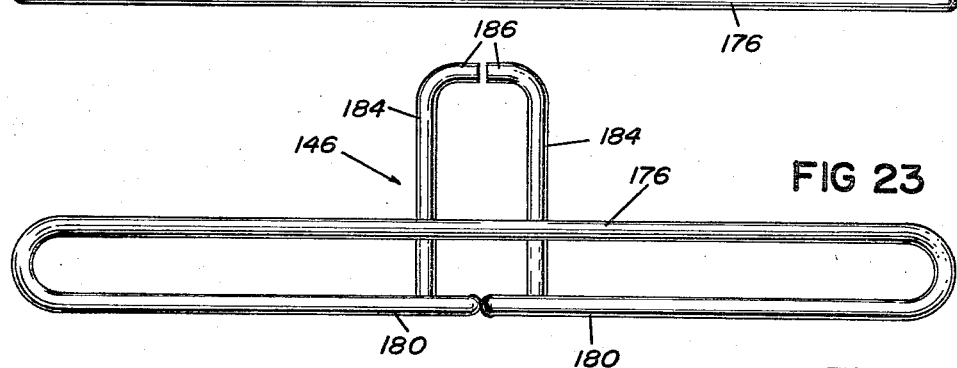
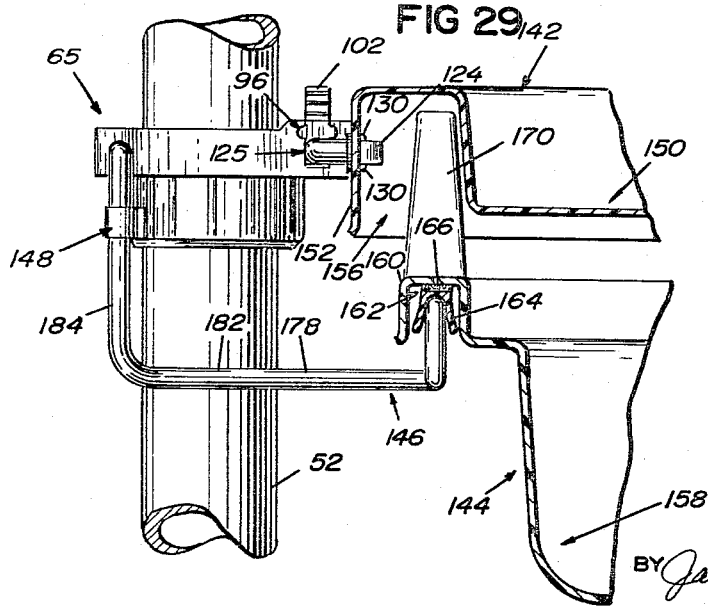
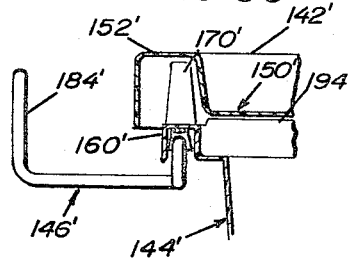

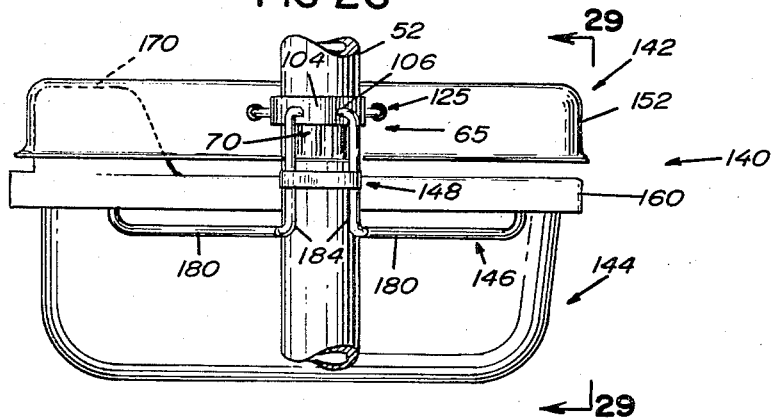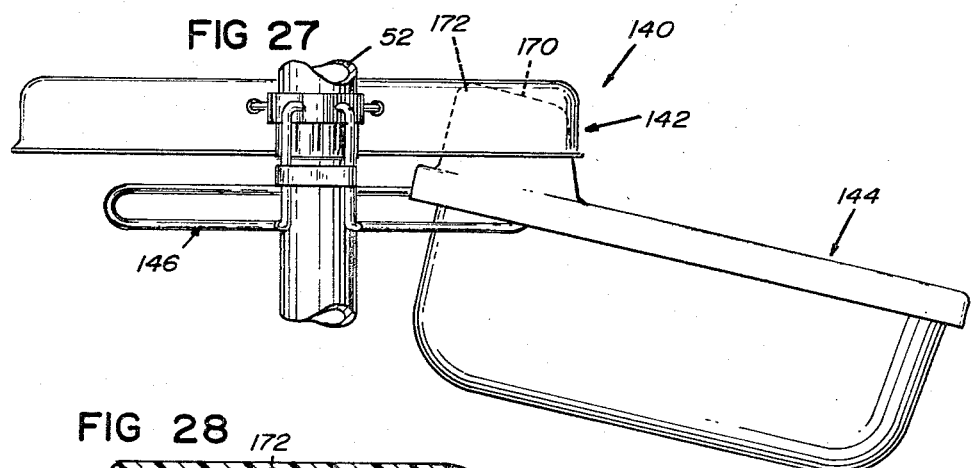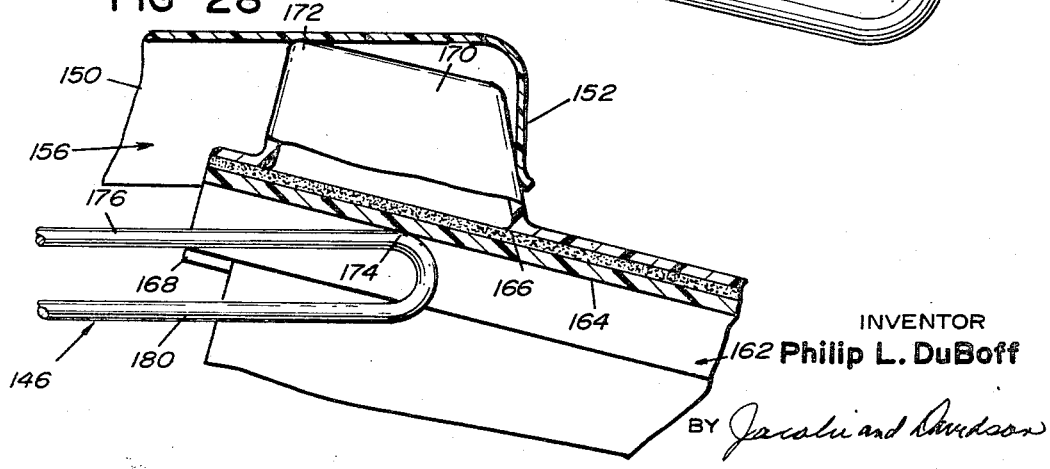

United States Patent Office 3,323,851
Patented June 6, 1967

3,323,851
UTILITY POLE ASSEMBLY AND ACCESSORIES
FOR USE THEREWITH
Philip L. Duboff, Kearny, N.J., assignor to Shelfmaker Products Corp., a corporation of New Jersey
Filed July 8, 1965, Ser. No. 470,493
28 Claims. (Cl. 312—255)

This invention relates generally to household utility pole assemblies such as the spring pressed poles which are commonly used to support various elements such as shelves, cabinets, planters and the like.

Many utility pole assemblies are currently available on the market for use throughout the house, for example, in the living room as a room divider, in the bathroom to support various toiletry items and elsewhere. It is to be understood that the assembly of the instant invention will find many applications and can be marketed in numerous combinations for a diversity of uses. For example, although spring pressed pole assemblies of this type generally extend between the floor and ceiling, shorter versions of the same may be provided for use in a kitchen, secured between a counter top and the underside of a kitchen cabinet. Additionally, units according to the instant inventive concept will find use in the nursery to support various baby items immediately adjacent a dressing table or the like. Further, the pole elements may be utilized to carry any number or combination of the conventional elements such as shelves and cabinets ordinarily provided as well as certain less common items such as a unique combination drawer and shelf unit, the construction of which forms a particular feature of this invention. Although certain designs and arrangements are mentioned herein as exemplary, it will be readily recognized that this information is merely for illustrative purposes and not in any way intended to be all inclusive.

The utility pole assemblies commercially available have included a broad range of fastener devices for securing the sides or shelves or other such units to the pole elements. However, the construction of such prior art devices has always necessitated the use of tools such as pliers and screw drivers to loosen and tighten the same for vertical adjustment of the units carried thereby. It is therefore a primary object of this invention to provide a fastener assembly which may be readily secured in position on a pole element, loosened and repositioned at any desired height on the pole, completely manually and without the need of any tools, nuts and bolts, etc. Moreover, it is a primary objective of this invention to provide a fastener device of the type described for use with a utility pole assembly which is extremely durable and inexpensive to manufacture, readily installed and utilized, and capable of supporting various units such as wire shelves and solid articles, for example, cabinets or the like as well as other items including towel rings, magazine racks, drawers and the like even though the particular accessory being supported is burdened with articles of great weight.

Consistent with the above, it is a primary and important object of this invention to provide a utility pole assembly including a fastener means uniquely adapted to securely support various and sundry pole-spanning units, certain of which, such as wire shelves, can be directly attached to the fastener means, and others of which, such as solid shelves or cabinets, can be readily modified by means of an inexpensive and easy to install adaptor, for attachment to the fastener means.

Along these same lines, it is a further object of this invention to provide a combination pole assembly wherein the units carried thereby are stably and securely supported against forward, rearward or lateral movement with respect to, or rocking about, the fastener devices. Moreover, with the use of the fastener means of this invention, the article being carried will be automatically leveled and centered, front to rear and side to side.

Another important object of this invention is the provision of a utility pole assembly wherein the shelves, cabinets or other articles being supported can be readily removed and replaced for cleaning or maintenance without moving the fastener devices relative to the pole elements.

Still another feature of this invention is the provision of a fastener device for a utility pole assembly which includes means for pivotally supporting a towel ring in a manner such that the ring may hang substantially vertically or parallel to the pole element with which it is associated whereby the towel supported thereby is more readily removed and replaced.

Yet another primary and basic object of this invention is the provision of a combination drawer and shelf unit which may be utilized in conjunction with a utility pole assembly, preferably incorporating fastener means which are universally applicable to this particular drawer and shelf unit as well as more conventional articles. Consistent with this object, the specific construction of the novel drawer and shelf unit is particularly adapted for simple and reliable securement to the preferred form of fastener assembly disclosed herein.

Additionally, it is an object of this invention to provide a drawer means which may be directly carried by a pair of spaced pole elements and readily vertically adjusted with respect thereto. Moreover it is an important object hereof to provide a combination drawer and shelf unit of the type described including stop means to limit the forward and rearward movement of the drawer between an opened and a closed position as well as various means to limit the downward tilt of the drawer member when the same is in the opened position.

In addition to the general primary objects set forth hereinabove, the present invention has further, more specific primary objects, namely, (a) the provision of a fastener assembly for use in carrying various articles between a pair of spring pressed or other similar vertically extending, parallel pole elements, which fastener assembly includes slide means vertically adjustable on an associated pole element, clamping means operatively engaging the slide means for manually and selectively tightening the same into frictional contact with the associated pole element at a desired position thereon, and attaching means for supporting in carrying relationship a portion of the article or unit to be utilized with the pole assembly; (b) the provision of a fastener assembly of the type described wherein the attaching means is universally adapted to carry both wire and solid appurtenances, the latter being provided with an adaptor, with a securing member operatively associated with the attaching means to tightly engage a portion of the article being carried to lock the same against relative movement with respect to the fastener assembly; (c) the provision of a fastener means which, in addition to being adapted for carrying more conventional items, is also designed to support a unique combination drawer and shelf unit by having diametrically opposed integral portions constructed to receive and carry (1) the shelf member thereof in fixed relation and (2) a runner element for slidingly supporting the drawer member immediately underlying the shelf member; (d) the provision of a combination drawer and shelf unit which cooperate with each other in a novel manner to permit the drawer member limited forward and rearward movement and limited downward tilt in the opened position for easy access to the contents of the drawer; (e) the provision of a utility pole assembly and various accessories for the use therewith all of which are sturdy and durable in construction, reliable and efficient in operation, and simple and inexpensive to manufacture, assemble, utilize and maintain.

Other and further objects reside in the combination of element, arrangement of parts and features of construction.

Still other objects will in part be obvious and in part be pointed out as the description of the invention proceeds and as shown in the accompanying drawings wherein:

FIGURE 1 is a perspective view of a utility pole assembly according to this invention with various conventional units carried thereby;

FIGURE 2 is a fragmentary enlarged cross-sectional view taken substantially on line 2—2 of FIGURE 1, with various parts broken away for illustrative convenience;

FIGURE 3 is a fragmentary vertical cross-sectional view taken substantially on line 3—3 of FIGURE 2;

FIGURE 4 is a fragmentary side elevational view taken substantially on line 4—4 of FIGURE 2;

FIGURE 5 is an exploded isometric view of certain portions of the preferred form of fastener assembly according to the instant inventive concept in combination with a pole element;

FIGURE 6 is a vertical cross-sectional view taken substantially on line 6—6 of FIGURE 5;

FIGURE 7 is an enlarged fragmentary cross-sectional detail view showing a portion of the tapered internal threads on the cap member of the fastener assembly of this invention;

FIGURE 8 is an isometric view of a securing member for use with the attaching means of the fastener assembly of this invention;

FIGURE 9 is an inverted isometric view of the securing member of FIGURE 8;

FIGURE 10 is a bottom plan view of an adaptor for use with articles having solid side portions to modify the same for association with the fastener assembly of the instant invention;

FIGURE 11 is a top plan view of the adaptor of FIGURE 10;

FIGURE 12 is an enlarged transverse cross-sectional view taken substantially on line 12—12 of FIGURE 11;

FIGURE 13 is a view similar to FIGURE 2, but taken substantially on line 13—13 of FIGURE 1, parts being broken away for illustrative convenience;

FIGURE 14 is a fragmentary vertical cross-sectional view taken substantially on line 14—14 of FIGURE 13;

FIGURE 15 is a fragmentary side elevational view of the solid shelf member of FIGURE 13 showing the holes therein for reception of the adaptor;

FIGURE 16 is a top plan view of a shelf member forming part of a combination drawer and shelf unit in accordance with one feature of the instant inventive concept;

FIGURE 17 is a side elevational view of the shelf member of FIGURE 16;

FIGURE 18 is a fragmentary rear elevational view thereof;

FIGURE 19 is a top plan view of the drawer member of the drawer and shelf unit of this invention;

FIGURE 20 is a side elevational view of the drawer member of FIGURE 19;

FIGURE 21 is a fragmentary rear elevational view thereof;

FIGURE 22 is an enlarged top plan view of a runner member for use with the drawer and shelf unit of this invention;

FIGURE 23 is a front elevational view of the runner member of FIGURE 22;

FIGURE 24 is a top plan view of a spring clip utilized in combination with the runner member of FIGURES 21 and 23;

FIGURE 25 is a side elevational view of the spring clip of FIGURE 24;

FIGURE 26 is a side elevational view of the drawer and shelf unit of this invention in related assembly and in the closed position of the drawer member;

FIGURE 27 is a view similar to FIGURE 26, but showing the drawer member in the opened position;

FIGURE 28 is an enlarged fragmentary detail view, with parts broken away for illustrative clarity, illustrating the tilt control and forward stop of the drawer member in the opened position;

FIGURE 29 is an enlarged fragmentary transverse cross-sectional view taken substantially on line 29—29 of FIGURE 26; and FIGURE 30 is a view similar to FIGURE 29, but showing a modified tilt control of the drawer member.

Like reference characters refer to like parts throughout the several views of the drawings.

Referring now to the drawings in general, and more particularly to FIGURE 1, a utility pole assembly according to this invention is designated generally by the reference numeral 50 and will be seen to comprise basically a pair of elongated pole members 52, 54 which are of substantially uniform cross-section over at least a major portion of their length whereby they may slidingly support various articles as will be explained in more detail hereinafter. The pole members 52, 54 shown as illustrative in FIGURE 1 are spring pressed for securely supporting the same between generally horizontally extending surfaces, usually the floor and ceiling, although as explained hereinabove other arrangements may be utilized. The details of construction of the pole members 52, 54 are not important to the instant invention, and although spring pressed pole members are preferred, other pole members of fixed or variable length will be satisfactory.

Three separate articles or units, a conventional wire shelf 56, a solid shelf 58 and a cabinet 60 are illustratively shown as carried by the pole members 52, 54 in the embodiment of FIGURE 1. This arrangement, as mentioned before, is to be considered merely as illustrative of the numerous diverse combinations and types of articles which may be supported by the pole assembly.

A detailed explanation of the construction and use of the preferred fastener assembly for carrying a conventional wire shelf such as 56 will now be set forth with particular reference to FIGURES 2–9. In this explanation, the support of only one end of the wire shelf is shown and described for convenience, but it will be understood that the opposite end of the shelf 56 is similarly supported.

The universal fastener assembly of this invention is designated generally by the reference numeral 65 and comprises basically a slide means 66 having an internal bore 68 whereby it normally loosely circumscribes the pole 52, a clamping means 70 operatively engaging the slide means 66 in a manner to be described in more detail hereinafter to manually tighten the slide means into frictional contact with the pole member 52 and an attaching means 72 shown as integral with the slide means 66 and adapted for carrying the freely extending, elongated wire element 74 forming one side of the wire shelf 56.

The slide means 66 is basically defined by an annular ring portion 76 defining the openings 68 with a plurality of fingers 78, four being shown merely as illustratively, integrally secured to the ring portion 76 and spaced from each other to together define a bore which is a continuation of the opening 68. The fingers 78 are formed of a resilient, preferably plastic, material whereby they may be squeezed in a manner to be explained in more detail hereinafter to define an opening smaller than the opening 68 whereby they are pressed into frictional contact with the pole 52 for clamping engagement therewith. This clamping engagement may be improved by roughening the inner surfaces of the free ends of the fingers 78 as shown at 80 in FIGURE 6.

The clamping means 70 is in a form of an annular cap member having internal threads 82 corresponding to the external threads 84 defined by the fingers 78. The portions defining one of the threads 82 or 84 is preferably tapered in order that on manually rotating the clamping means 70 the fingers 78 are squeezed together to grippingly engage the pole member 52. As illustrative of such a construction, reference is made to FIGURE 7 wherein a greatly enlarged fragmentary section of a portion of the wall of the clamping means 70 will be seen to increase in thickness toward its base.

The outside of the annular cap member may be knurled or provided with spaced ribs such as shown at 86 to facilitate manually engaging the thread means to tighten the fastener assembly 65 on the pole member 52.

The attaching means, as will be seen from the drawings, includes a base member 88 integral with respect to, and offset from, the ring portion 76 of the slide means 66. This base member 88 has an elongated groove 90 dimensioned to receive the wire element 74 of the shelf 56 in carrying relationship.

A pair of opposed guide members 92 are also defined in the base member 88 to slidingly receive a pair of guides 94 forming part of a securing member 96 shown in detail in FIGURES 8 and 9. The undersurface of the securing member 96 defines a groove 98 which extends in overlying relation to the wire elements 74 in the related assembly of the attaching means 72 as will be seen particularly in FIGURE 3. A plurality of spaced resilient protuberances 100 which may be integral with the securing member 96 are carried within the groove 98 and function to resiliently engage the wire element 74 in the related assembly of the attaching means 72. The protuberances 100 are preferably arranged as shown particularly in FIGURE 9 to provide even and substantial locking engagement with the wire element 74. In order to facilitate slidingly engaging and removing the guides 94 of the securing member 96 in the guideways 92 of the base member 88, a pair of upstanding finger-engaging members 102 are preferably provided on the upper surface of the securing member 96.

Preferably an offset lug 104 is provided on the ring portion 76 of the slide means 66 in diametrically opposed relation to the attaching means 72. This lug 104 has a continuous transverse bore 106 therethrough to define a pair of opposed openings at the extremities of the same. A towel ring 108 which may be split as shown at 110 in FIGURE 4 is pivotally supported in the bore 106 to carry a towel in a well known manner. However, it will be seen that the bore 106 is offset sufficiently from the pole member 52 to permit the towel ring 108 to extend downwardly in a direction generally parallel to the pole member 52 thereby facilitating removing a towel from the ring 108 and later replacing the towel.

The use and operation of the fastener assemblies 65 in combination with the utility poles of FIGURE 1 will now be apparent. The slide means 66 and clamping means 70 are slipped over their associated pole members before securing the pole members into position. Of course, a sufficient number of fastener assemblies should be included on each pole member to carry all of the articles which the poles are to support. The slide means 66 are rotated on their associated pole members until the attaching means 72 on the opposed pole members are facing each other and until the slide members are at a desired vertical adjustment. The internal threads 82 of the clamping means 70 are then rotatably and manually engaged with the external threads 84 of the fingers 78 to squeeze the fingers together into frictional contact with their associated pole member thereby fixing the fastener assembly in a desired adjusted position. When a pair of fastener assemblies have been secured in approximate horizontal alignment the wire shelf, or any other article having integral, freely extending, wire elements at each of its sides, is positioned so that the wire elements are received in the grooves 90 of the attaching means 72. The securing members 96 are then slidingly engaged in overlying relationship to the wire elements to lock the same in place, the protuberances 100 precluding forward or rearward slipping of the wire elements. In view of the fact that the grooves 90 are somewhat elongated, the wire shelf will be stabilized against forward or rearward rocking and will be maintained substantially level.

The height of the shelf on the pole members may be readily varied by merely loosening the clamping means 70 and adjusting the position of the slide means 66 before again tightening the clamping means. Moreover, the wire shelf may be removed for cleaning, maintenance or replacement without varying the vertical positioning of the fastener assemblies 65, merely by slidingly removing the securing member 96 and lifting the wire element 74 free of the elongated grooves 90 and the attaching means 72.

FIGURES 10 through 15 show the use of the fastener means 65 with an article which does not, on its own, have a freely extending, elongated element such as the member 74 of the wire shelf 56. In this embodiment a solid shelf 58 is shown having a substantially solid upstanding peripheral wall 115 fixed in any conventional manner to a shelf member 116 and carrying upper and lower beads 118, 120 covering its edges. The solid element 115 is provided with a pair of spaced openings 122 at each of its sides, these openings being adapted to receive the resilient offset end portions 124 of an adaptor 125 shown in detail in FIGURES 10–12. The adaptor 125, preferably made of nylon or the like, has an intermediate portion 126 of squared lower cross-section as will be seen particularly in FIGURE 12 to correspond to the squared cross-section of the elongated groove 90 of the attaching means 72. Further, intermediate portion 126 carries a pair of downwardly extending projections 128 dimensioned to engage opposite sides of the extremities of the groove 90 when the intermediate portion is received therein in carrying relationship. The squared lower cross-section stabilizes the engagement of the adaptor 125 in the attaching means 72 and the projections 128 automatically front-to-rear position the article carrying the adaptors 125 with respect to the pole members.

It will be noted that the offset end portions 124 of the adaptor 125 are split to provide the resiliency necessary to allow the bulbous extremities of the same to pass through the openings 122. However, in order to securely retain the end portions 124 within the openings 122, they are provided with spaced resilient barbs 130 which function in an obvious manner.

After engagement of the adaptors 125 in the openings 122 on the opposite sides of the article to be carried, the use of this embodiment of the invention is substantially the same as with the wire shelf. It will be seen that the adaptors 125 may be similarly associated with a cabinet such as shown at 60 in FIGURE 1 or any other article having substantially solid side portions.

In FIGURES 16 through 30 a further feature of the instant invention is shown in the form of a combination drawer and shelf unit which provides a unique construction whereby an individual drawer means is capable of being directly supported by a utility pole assembly. Such a construction will find obvious applications, for example, as a means for storing hair rollers and similar grooming aids in the bathroom, as a vegetable bin in the kitchen or as a tool kit in a work shop.

Although other forms of fastener devices may be utilized in conjunction with the novel drawer and shelf unit of this invention, the basic fastener assembly 65 illustrated and described with reference to the preceding embodiments, is particularly adapted for quick and efficient association with the combination drawer and shelf unit as will be seen hereinafter.

The drawer and shelf unit of this invention is designated generally by the reference numeral 140 and comprises basically a shelf member 142, shown in detail in FIGURES 16–18, a drawer member 144, shown in detail in FIGURES 19–21, a runner member 146, shown in detail in FIGURES 22 and 23, and preferably, a spring clip 148, shown in detail in FIGURES 24 and 25.

The shelf member 142 includes a recessed central portion 150 and a downwardly extending peripheral flange 152. Oppositely disposed side portions of the peripheral flange 152 each have a pair of spaced openings 154 similar to the openings 122 as shown in FIGURE 15 with respect to the previous embodiment and designed to receive the end portions 124 of adaptors 125 whereby the shelf member 142 may be carried by the attaching means 72 of fastener assemblies 65 adjustably supported on spaced pole members of a utility pole assembly.

The central portion 150 and the side portions of the peripheral flange 152 of the shelf member 142 together define downwardly opening guideways 156 extending along each of the sides of the shelf member 142 as will be seen particularly in the cross-sectional views, FIGURES 28 and 29. The front and rear portions of the peripheral flange 152 define front and rear abutments blocking the extremities of each of the guideways 156 for a purpose to be described in more detail hereinafter.

The drawer member 144 has a relatively deep depressed central portion 158 defining a storage receptacle which may be in the form of a single cabinet as shown in the drawings or compartmented in any desired manner. The depressed portion 158 is surrounded by a peripheral lip 160, the side portions of which, in combination with the depressed central portion 158 of the drawer member 144, together define downwardly opening channels 162 along each side of the drawer member 144 as will be seen particularly from the cross-sectional views, FIGURES 28 and 29. The channels 162 may themselves be dimensioned to be slidingly supported on the runner members 146, but preferably, inverted U-shaped nylon elements 164 are secured within the channels 162 as by any conventional adhesive means 166. The peripheral lip 160 has slots 168 in its rear portion aligned with the elements 164 to permit passage of the runner members 146 on forward movement of the drawer in use.

An upwardly extending projection 170 is carried by the peripheral lip 160 of the drawer member 144 adjacent its rear edge along each of its sides. The projections 170 are dimensioned to ride in the guideways 156 of the shelf member 142 thereby providing lateral guidance for the movement of the drawer member 146. These projections 170 further serve as a stop means to limit the forward and rearward movement of the drawer member 146 by engaging the abutments at the extremities of the guideways 156 as will be seen particularly in FIGURES 26 and 27. Moreover, the projections 170 are so dimensioned as to closely underlie the guideways 156 in order that the rearward corners 172 of the projections engage the top of the guideways 156 to limit the downward tilting of the drawer member 144 in its opened position. It will be readily recognized that the drawer member 144 will tilt forwardly as soon as its center of gravity passes beyond the pivot points 174 defined by the forward ends of the runner portions 176 of the runner elements 146. The manner in which this tilt control functions will be readily seen in FIGURES 27 and 28.

The runner elements 146 are each preferably in the form of a one piece wire member, the center of which defines the runner portions 176 which slidingly support the drawer member 144. Each of the runner elements include a pair of juxtaposed resilient legs 178 attached to the runner portion 176 by the return portions 180. The legs 178 are spread apart at 182 adjacent their extremities in order to circumscribe their associated pole member. Upwardly extending resilient arms 184 are attached to the extremities of the legs and have offset opposed end portions 186 which are adapted to be snappingly engaged in the openings defined by the end portions of the bore 106 in the lug 104 of the fastener assembly 65.

The small spring clip 148 shown in FIGURES 24 and 25 may be resiliently engaged about the arms 184 of the runner element 146 to preclude accidental disengagement of the end portions 186 from the openings defined by the bore 106 in the lug 104.

The use and operation of the combined drawer and shelf unit 140, particularly in combination with the fastener assembly 65 will be readily understood. After securing the fastener assemblies at a desired vertical adjustment on the pole members and with their attaching means facing each other, the spread portions 182 of the legs 178 of the runner elements 146 are engaged around the associated pole members and the offset end portions 186 of the arms 184 are secured within the opposed openings defined by the ends of the bores 106 in the lugs 104. In order to maintain the end portions 186 in position the spring clips 148 may then be resiliently attached to the arms 184. It will be noted that these clips are provided with one arcuate inwardly bent end 190 for engagement about one of the arms 184 and an outwardly bent end 192 which may be snapped into engagement with the other arm 184.

After securing the runner elements 146 in position the U-shaped elements 164 of the drawer member 144 may then be positioned over the runner portion 176 for sliding engagement therewith.

Following attachment of the adaptors 125 to the opposite sides of the shelf member 142 by engagement of the offset ends 124 of the adaptors in the openings 154 of the peripheral flange 152 of the shelf member, the intermediate portion 126 of the adaptors may be positioned within the grooves 90 of the attachment means 72. The small projections 128 on the adaptors 125 will automatically center the shelf member 142 from front to rear. The securing members 96 may then be slidingly engaged to lock the shelf member 142 in the related assembly wherein the projections 170 on the drawer member 144 will be slidingly received within the guideways 156 of the shelf member 142. The drawer member 144 may then be moved between the closed position shown in FIGURE 26 and the opened position shown in FIGURE 27, forward or rearward movement being limited by the engagement of the projections 170 with the abutments defined by the front and rear portions of the peripheral flange 152 of the shelf member 142. Further, downward tilt in the opened position of FIGURE 27 will be limited by engagement of the rearward corner 172 of the projections 170 with the top of the guideways 156 as explained hereinabove.

Vertical adjustment of the entire combination drawer and shelf unit may be readily accomplished without disassembly of the parts merely by loosening the clamping means 70 and re-engaging the same at a new desired height. It will be noted that the arrangement of the elements in the related assembly automatically levels the unit from front to rear and facilitates in leveling the unit from side to side since a misalignment of the fastener assemblies 65 will be readily recognized and easily corrected.

The amount of downward tilt of the drawer member will be determined by a number of factors. Variation in the overall tilt may be accomplished by modifying the dimensional relationships between certain parts. For example, an embodiment of the drawer and shelf unit having less tilt is shown in FIGURE 30 wherein parts similar to the previous embodiment are designated by the same reference numeral followed by a prime. One means of decreasing the tilt is by shortening the length of the arms 184' of the runner elements 146' or increasing the height of the projections 170' of the drawer member 144' to thereby decrease the amount of space between the top of the projections and the under part of the top of the peripheral flange 152' of the shelf member 142'. Additionally, if desired, an upstanding element 194 may be provided on the rear edge of the peripheral lip 160' of the drawer member 144', this element 194 closely underlines the bottom of the depressed central portion 150' of the shelf member to further limit the amount of tilt in the drawer member in its opened position. This upstanding element 194 has the additional function of further stabilizing the drawer member 144' from side to side.

Although each of the solid articles to be carried by the utility pole assembly of this invention, such as the shelf 58, the cabinet 60 and the shelf member 142 have been shown as utilizing the adaptors 125 for support, it will be recognized that solid articles of this type could be provided during their manufacture with a freely extending elongated element for this purpose whereby the adaptors would not be necessary. Each of the elements illustrated and described herein may be formed of any desired material such as plastic, metal or the like and the sizes and shapes, particularly of the articles to be carried by the pole assembly may be varied to satisfy the requirements of any particular application.

Thus, it will now be seen that there is herein provided an improved utility pole assembly and accessories therefore which satisfy all of the objects of the instant invention, and others, including many advantages of great practical utility and commercial importance. Specifically, there is herein disclosed a fastener assembly which may be utilized without the need for any tools, nuts and bolts or other extraneous implements. Further, this invention provides a unique drawer means which is directly carried by the pole elements in contrast to, for example, a drawer merely forming part of a cabinet which is carried by the pole members. Each and every element herein is simple and inexpensive to manufacture, yet durable in construction and efficient in use.

Since there may be many embodiments of the instant inventive concept, and many modifications of the embodiments hereinbefore shown and described, it is to be understood that all matter herein is to be interpreted merely as illustrative and not in a limiting sense. Accordingly,

What is claimed is:

1. In combination, a first elongated pole means of substantially uniform cross-section over at least a major portion of its length, a second elongated pole means of substantially uniform cross-section over at least a major portion of its length, said second pole means being spaced from said first pole means and substantially parallel thereto, an article extending between said pole means and having a first side juxtaposed to said first pole means and an opposed second side juxtaposed to said second pole means, a first fastener assembly securing said first side of said article to said first pole means, and a second fastener assembly securing said second side of said article to said second pole means, each of said fastener assemblies including a slide means, a clamping means and an attaching means, said slide means normally loosely circumscribing its associated pole means, said clamping means operatively engaging said slide means for manually selectively tightening said slide means into frictional contact with said associated pole means at a desired position thereon, and said attaching means carrying its associated side of said article, said slide means including a plurality of fingers spaced about the periphery of said associated pole means to normally define an opening slightly larger than said cross-section of said associated pole means, portions of said fingers being resiliently movable toward said associated pole means to define a smaller opening whereby said portions of said fingers frictionally contact said associated pole means, and said clamping means selectively moving said portions of said fingers toward said associated pole means, said clamping means including an annular cap member threadably engaged about said fingers and manually rotatable from a loose position wherein said portions of said fingers define said opening slightly larger than said cross-section of said associated pole means to a tightened position wherein said portions of said fingers define said smaller opening and said attaching means being fixed to said slide member.

2. The combination of claim 1 wherein said pole means are spring pressed pole elements resiliently secured between upper and lower, generally horizontally extending, supporting surfaces.

3. The combination of claim 1 wherein said portions of said fingers which frictionally contact said associated pole means are roughened.

4. The combination of claim 1 wherein said slide means includes an annular ring portion defining an opening slightly larger than said cross-section of said associated pole means, said fingers being integrally secured to said ring portion and having resilient free ends extending from said ring portion about said associated pole means in spaced relation to each other, said opening normally defined by said fingers being substantially a continuation of said opening defined by said ring portion, and said clamping means operatively engaging said free ends of said fingers for selectively moving said free ends toward said associated pole means to frictionally contact said associated pole means.

5. The combination of claim 4 wherein said clamping means includes an annular cap member having portions defining internal thread means, and said fingers together having portions defining external thread means operatively associated with said internal thread means on said cap member, said portions defining one of said thread means being tapered whereby on manually tightening said cap member, said fingers are pressed into frictional contact with said associated pole means.

6. The combination of claim 1 wherein each of said sides of said article includes a freely extending, elongated element, said attaching means securely supporting said element in carrying relationship.

7. The combination of claim 6 wherein said element is an integral side portion of a wire article.

8. In combination, a first elongated pole means of substantially uniform cross-section over at least a major portion of its length, a second elongated pole means of susbtantially uniform cross-section over at least a major portion of its length, said second pole means being spaced from said first pole means and substantially parallel thereto, an article extending between said pole means and having a first side juxtaposed to said first pole means and an opposed second side juxtaposed to said second pole means, a first fastener assembly securing said first side of said article to said first pole means, and a second fastener assembly securing said second side of said article to said second pole means, each of said fastener assemblies including a slide means, a clamping means and an attaching means, said slide means normally loosely circumscribing its associated pole means, said clamping means operatively engaging said slide means for manually selectively tightening said slide means into frictional contact with said associated pole means at a desired position thereon, and said attaching means carrying its associated side of said article, each of said sides of said article including a freely extending, elongated element, said attaching means securely supporting said element in carrying relationship, said element being defined by an intermediate portion of an adaptor, said article having portions at each side defining a pair of spaced openings, and said adaptor having a pair of end portions offset from said intermediate portion and resiliently engaged in said openings.

9. The combination of claim 8 wherein said end portions of said adaptor each have at least one resilient barb to secure said end portions in said openings.

10. The combination of claim 8 wherein each of said attaching means includes a base member defining an elongated upwardly opening groove having a squared cross-section and front and rear extremities, said intermediate portion of said adaptor having a correspondingly squared lower cross-section carried in said groove and downwardly extending projections dimensioned to engage said base member on opposed sides of said extremities of said groove to position said article with respect to said pole means.

11. In combination, a first elongated pole means of substantially uniform cross-section over at least a major portion of its length, a second elongated pole means of substantially uniform cross-section over at least a major portion of its length, said second pole means being spaced from said first pole means and substantially parallel thereto, an article extending between said pole means and having a first side juxtaposed to said first pole means and an opposed second side juxtaposed to said second pole means, a first fastener assembly securing said first side of said article to said first pole means, and a second fastener assembly securing said second side of said article to said second pole means, each of said fastener assemblies including a slide means, a clamping means and an attaching means, said slide means normally loosely circumscribing its associated pole means, said clamping means operatively engaging said slide means for manually selectively tightening said slide means into frictional contact with said associated pole means at a desired position thereon, and said attaching means carrying its associated side of said article, each of said sides of said article including a freely extending, elongated element, said attaching means securely supporting said element in carrying relationship, said attaching means including a base member having portions defining an elongated groove dimensioned to receive said element in carrying relationship, additional portions of said base member defining a pair of opposed guideways spaced from said groove, said attaching means further including a securing member having portions defining a pair of guides removably and slidingly received in said guideways, additional portions of said securing member defining an opposed groove extending in overlying relation to said element in the related assembly of said attaching means and said element.

12. The combination of claim 11 wherein said portions defining at least one of said grooves further defines at least one resilient protuberance extending toward said portions defining the other of said grooves, said protuberance resiliently engaging said element in said related assembly.

13. The combination of claim 12 wherein said portions defining said groove in said securing member further defines a plurality of spaced resilient protuberances to provide for evenly engaging said element in said related assembly.

14. The combination of claim 12 further including at least one finger-engaging means on said securing member to facilitate slidingly engaging and removing said guides of said securing member in said guideways of said base member while compressing said protuberance against said element.

15. In combination, a first elongated pole means of substantially uniform cross-section over at least a major portion of its length, a second elongated pole means of substantially uniform cross-section over at least a major portion of its length, said second pole means being spaced from said first pole means and substantially parallel thereto, an article extending between said pole means and having a first side juxtaposed to said first pole means and an opposed second side juxtaposed to said second pole means, a first fastener assembly securing said first side of said article to said first pole means, and a second fastener assembly securing said second side of said article to said second pole means, each of said fastener assemblies including a slide means, a clamping means and an attaching means, said slide means normally loosely circumscribing its associated pole means, said clamping means operatively engaging said slide means for manually selectively tightening said slide means into frictional contact with said associated pole means at a desired position thereon, and said attaching means carrying its associated side of said article, each of said fastener assemblies including an offset lug diametrically opposed to said attaching means, said lugs each defining a pair of opposed openings, a pair of runner elements extending substantially perpendicularly to said pole means and parallel to each other, each of said runner elements having a runner portion and a pair of resilient legs attached to said runner portion and extending on opposite sides of its associated pole means into gripping relationship therewith, said legs terminating in upwardly extending resilient arms having end portions snappingly engaged in said openings in its associated lug, said article comprising a combination drawer and shelf unit including a drawer member having its opposed sides slidingly supported by said runner portions for forward and rearward movement between an opened position and a closed position, and a shelf member immediately overlying said drawer member and having its opposed sides carried by said attaching means, stop means associated with said unit to limit the forward and rearward movement of said drawer member between said opened and closed positions.

16. The combination of claim 15 further including a spring clip resiliently and removably engaging said arms of each runner element to preclude accidental disengagement of said end portions from said openings in said lugs.

17. The combination of claim 15 wherein said shelf member includes downwardly opening guideways extending along each of its sides, each of said guideways having a front and rear abutment blocking its extremities, said drawer member having upwardly extending projections adjacent its rear edge along each of its sides, said projections riding in said guideways and engaging said front and rear abutments to define said stop means.

18. The combination of claim 17 wherein the distances between the top of said projections and said guideways in said shelf member, and the distance between said rear edge of said drawer member and the underside of said shelf member, are dimensioned to provide a desired amount of downward tilt to said drawer member when in said opened position.

19. The combination of claim 17 wherein said sides of said shelf member have portions defining a pair of spaced openings, an adaptor for each side of said shelf member, each of said adaptors having an intermediate portion spaced from its associated shelf member side and a pair of offset end portions resiliently engaged in said openings in said shelf member side, each of said attaching means including a base member having portions defining an elongated groove dimensioned to receive said intermediate portion of its associated adaptor, and a securing member slidingly and removably received by said base member in overlying relationship to said intermediate portion of said adaptor.

20. In combination with a pair of elongated, generally vertically extending, parallel pole means, a drawer and shelf unit extending between and carried by said pole means, said unit comprising a shelf member having opposed sides juxtaposed to said pole means, a drawer member immediately underlying said shelf member and having opposed sides juxtaposed to said pole means, attaching means securing said opposed sides of said shelf member to said pole means, and runner elements secured to each of said pole means and having runner portions slidingly supporting said opposed sides of said drawer member for forward and rearward movement between an opened and a closed position, said shelf member including a recessed central portion and a downwardly extending peripheral flange spaced from said central portion, said central portion and said flange together defining downwardly opening guideways extending along each of said sides of said shelf member and a front and rear abutment blocking the extremities of each of said guideways, said drawer member including upwardly extending projections adjacent its rear edge along each of its sides, said projections riding in said guideways and engaging said front and rear abutments to stop said drawer member in said opened and closed positions.

21. The combination of claim 20 wherein the forward ends of said runner portions of said runner elements define pivot points to permit the forward end of said drawer member to tilt downwardly in said opened position when the center of gravity of said drawer member passes said pivot points.

22. The combination of claim 21 wherein the upper ends of said projections closely underly said guideways to limit the downward tilting of said drawer member.

23. The combination of claim 21 wherein said rear edge of said drawer member closely underlies the bottom of said recessed central portion of said shelf member to limit the downward tilting of said drawer member.

24. In combination with a pair of elongated, generally vertically extending, parallel pole means, a drawer and shelf unit extending between and carried by said pole means, said unit comprising a shelf member having opposed sides juxtaposed to said pole means, a drawer member immediately underlying said shelf member and having opposed sides juxtaposed to said pole means, attaching means securing said opposed sides of said shelf member to said pole means, and runner elements secured to each of said pole means and having runner portions slidingly supporting said opposed sides of said drawer member for forward and rearward movement between an opened and a closed position, said attaching means and said runner elements both being secured to their associated pole means by a single fastener assembly.

25. The combination of claim 24 wherein each of said fastener assemblies includes an annular ring portion circumscribing said pole means, said ring portion having an offset upwardly opening grooved member defining said attaching means, a freely extending, elongated element secured to each of said sides of said shelf member and being received in said grooved members in carrying relationship, said ring portion further having an offset lug diametrically opposed to said grooved member, said lug having portions defining a pair of opposed openings, each of said runner elements including a pair of juxtaposed resilient legs attached to said runner portion, said legs being spread adjacent their extremities to circumscribe their associated pole means, and upwardly extending resilient arms attached to said extremities of said legs, said arms having offset opposed end portions snappingly engaged in said openings in their associated lug.

26. The combination of claim 25 wherein each of said fastener assemblies is slidingly adjustable on its associated pole means, further including clamping means forming part of each fastener assembly and manually operable to selectively secure said fastener assembled at a desired position on its associated pole means.

27. The combination of claim 25 further including a spring clip resiliently and removably engaging said arms of each runner element to preclude accidental disengagement of said end portions from said opening in said lugs.

28. The combination of claim 25 further including securing members slidingly and removably received by said grooved members in overlying relationship to said elements secured to said sides of said shelf member.

References Cited

UNITED STATES PATENTS

| | | | |
|---|---|---|---|
| 1,300,412 | 4/1919 | Jones | 248—188.5 |
| 2,620,025 | 12/1952 | Powers | 287—58 X |
| 2,941,669 | 6/1960 | Palay et al. | 211—86 X |
| 3,110,534 | 11/1963 | Nelson et al. | 312—330 |

FOREIGN PATENTS

| | | |
|---|---|---|
| 549,860 | 8/1956 | Belgium, |
| 855,715 | 2/1940 | France. |

CLAUDE A. LE ROY, *Primary Examiner.*

CHANCELLOR E. HARRIS, *Examiner.*

FRANK DOMOTOR, *Assistant Examiner.*